United States Patent
McKnight et al.

(10) Patent No.: US 11,988,173 B2
(45) Date of Patent: May 21, 2024

(54) MULTI-PULSE PROPULSION SYSTEM WITH PASSIVE INITIATION

(71) Applicant: Raytheon Company, Tewksbury, MA (US)

(72) Inventors: Richard W. McKnight, Tucson, AZ (US); David W. Homes, Tucson, AZ (US); William Sanborn, Jr., Chandler, AZ (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/075,987

(22) Filed: Oct. 21, 2020

(65) Prior Publication Data

US 2022/0120241 A1    Apr. 21, 2022

(51) Int. Cl.
*F02K 9/95*    (2006.01)
*F02K 9/08*    (2006.01)
(Continued)

(52) U.S. Cl.
CPC ............... *F02K 9/95* (2013.01); *F02K 9/08* (2013.01); *F02K 9/26* (2013.01); *F02K 9/28* (2013.01);
(Continued)

(58) Field of Classification Search
CPC ..... F02K 9/08; F02K 9/26; F02K 9/28; F02K 9/38; F02K 9/95; F42C 1/09; F42C 11/00;
(Continued)

(56) References Cited

U.S. PATENT DOCUMENTS 3,287,912 A * 11/1966 Hans-Dieter ............. F02K 9/28
                                                                 60/39.47
4,372,239 A     2/1983 Hagelberg
(Continued)

FOREIGN PATENT DOCUMENTS

CA         1156511 A       11/1983
CN         1150447         5/1997
(Continued)

OTHER PUBLICATIONS

Pike, John, Zuni 5.0-Inch [130 mm] Rocket, Apr. 13, 2010, GlobalSecurity.org (Year: 2010).*
(Continued)

*Primary Examiner* — Kyle Robert Thomas
(74) *Attorney, Agent, or Firm* — Schwegman Lundberg & Woessner, P.A.

(57) ABSTRACT

A multi-pulse propulsion system includes at least one pulse chamber containing at least one propellant for igniting during at least one pulse of the multi-pulse propulsion system, at least one additional pulse chamber containing at least one additional propellant for igniting during at least one additional pulse of the multi-pulse propulsion system, and at least one passive fuzing system configured to initiate the at least one additional pulse. The at least one passive fuzing system includes a sensor and an igniter. The sensor is configured to sense an environmental condition and/or a ballistic condition. The igniter is configured to provide a stimulus that causes ignition of the at least one additional propellant in response to the sensor sensing that the environmental condition and/or the ballistic condition has reached or exceeded one or more threshold values.

20 Claims, 5 Drawing Sheets

(51) Int. Cl.
F02K 9/26 (2006.01)
F02K 9/28 (2006.01)
F02K 9/38 (2006.01)
F42C 1/09 (2006.01)

(52) U.S. Cl.
CPC ............... *F02K 9/38* (2013.01); *F42C 1/09* (2013.01); *F05D 2260/85* (2013.01)

(58) Field of Classification Search
CPC ...... F42C 11/06; F42C 15/40; F42C 19/0819; F42C 9/14
See application file for complete search history.

(56) References Cited

U.S. PATENT DOCUMENTS

| | | | |
|---|---|---|---|
| 4,798,142 | A | 12/1990 | Canterberry |
| 5,024,160 | A | 6/1991 | Canterberry |
| 5,062,365 | A | 11/1991 | Canterberry |
| 5,109,669 | A | 5/1992 | Morris |
| 5,127,223 | A | 7/1992 | Hightower, Jr. |
| 5,166,468 | A * | 11/1992 | Atkeson ............... F42B 3/13 102/207 |
| 5,206,989 | A * | 5/1993 | Smith ............... F02K 9/763 29/447 |
| 5,238,204 | A | 8/1993 | Metz |
| 6,769,241 | B2 | 8/2004 | Spanjers |
| 6,819,237 | B2 * | 11/2004 | Wilson ............... G08B 17/00 89/41.21 |
| 6,832,556 | B1 | 12/2004 | Smalley, Jr. |
| 6,889,610 | B2 * | 5/2005 | Boucher ............... F42D 1/05 244/3.22 |
| 6,958,813 | B1 | 10/2005 | Ahmadjian |
| 7,000,377 | B1 | 2/2006 | Knight |
| 7,047,885 | B1 * | 5/2006 | Crickenberger ...... F41A 1/02 102/202 |
| 7,202,809 | B1 | 4/2007 | Schade |
| 7,484,353 | B1 | 2/2009 | Figge, Sr. |
| 7,565,795 | B1 | 7/2009 | Horn |
| 7,578,122 | B1 | 8/2009 | Figge, Sr. |
| 8,375,697 | B2 | 2/2013 | Valentian |
| 8,966,879 | B1 | 3/2015 | Munson |
| 9,062,712 | B1 | 6/2015 | Bruckner |
| 9,227,883 | B2 | 1/2016 | Sippel |
| 9,476,399 | B1 | 10/2016 | Munson |
| 9,518,802 | B2 | 12/2016 | Wei |
| 9,751,643 | B2 | 9/2017 | Rossettini |
| 9,822,045 | B2 | 11/2017 | Jones |
| 9,853,744 | B2 | 12/2017 | Damus |
| 9,881,706 | B2 | 1/2018 | Adams |
| 9,947,423 | B2 | 4/2018 | Adams |
| 10,006,981 | B2 | 6/2018 | Tidhar |
| 10,286,599 | B2 | 5/2019 | Jones |
| 2003/0079744 | A1 | 5/2003 | Bonney |
| 2008/0095652 | A1 | 4/2008 | Jiang |
| 2012/0279411 | A1 * | 11/2012 | Daoud ............... F42B 12/207 102/497 |
| 2017/0097213 | A1 | 4/2017 | Villarreal et al. |
| 2017/0133954 | A1 * | 5/2017 | Rastegar ............ C07D 207/325 |

FOREIGN PATENT DOCUMENTS

| | | |
|---|---|---|
| CN | 1403781 A | 3/2003 |
| CN | 1514871 A | 7/2004 |
| CN | 2799011 Y | 7/2006 |
| CN | 200970429 Y | 11/2007 |
| CN | 101802136 B | 9/2014 |
| CN | 103194284 B | 5/2015 |
| CN | 101553558 B | 8/2015 |
| CN | 104989551 A | 10/2015 |
| CN | 105065137 A | 11/2015 |
| CN | 105065138 A | 11/2015 |
| CN | 103670797 B | 12/2015 |
| CN | 105114208 A | 12/2015 |
| CN | 105134411 A | 12/2015 |
| CN | 107796270 A | 3/2018 |
| CN | 106988929 B | 7/2018 |
| CN | 105971767 B | 8/2018 |
| CN | 109441664 A | 3/2019 |
| CN | 110237462 A | 9/2019 |
| CN | 108894893 B | 2/2020 |
| DE | 2831420 C2 | 2/1988 |
| DK | 2802838 T3 | 7/2017 |
| EP | 2242691 B1 | 3/2017 |
| FR | 2545599 B1 | 10/1986 |
| FR | 2543288 B1 | 7/1987 |
| FR | 2682468 B1 | 6/1994 |
| FR | 2728676 B1 | 3/1997 |
| GB | 1225685 A | 3/1971 |
| GB | 2162621 A | 2/1986 |
| GB | 2265442 B | 5/1994 |
| GB | 2314610 B | 5/1998 |
| IN | 106383922 A | 2/2017 |
| JP | H08207694 | 8/1996 |
| JP | 2004100706 A | 4/2004 |
| JP | 2010155060 A | 7/2010 |
| JP | 2015006650 A | 1/2015 |
| RO | 133060 A2 | 1/2019 |
| RU | 2133864 C1 | 7/1999 |
| RU | 2225586 C1 | 3/2004 |
| RU | 2561182 C2 | 8/2015 |
| RU | 2600971 C2 | 10/2016 |
| RU | 2678726 C1 | 1/2019 |
| WO | 2008082427 A1 | 7/2008 |
| WO | 2012003706 A1 | 1/2012 |
| WO | 2019123801 A1 | 6/2019 |
| WO | 2019146595 | 8/2019 |

OTHER PUBLICATIONS

International Search Report and Written Opinion dated Nov. 24, 2021, in corresponding International Application No. PCT/2021/017415.

* cited by examiner

MULTI-PULSE PROPULSION SYSTEM WITH PASSIVE INITIATION

FIELD OF THE INVENTION

The invention relates to multi-pulse propulsion systems for flight vehicles, and more particularly to a multi-pulse rocket motor with one or more passively initiated pulses.

DESCRIPTION OF THE RELATED ART

Various applications use launchable payloads that are launched from a suitable platform, such as a land, sea, air, or space vehicle. The payload to be launched is dependent on the application. Military applications that use land vehicles, aircrafts, surface ships, or underwater vehicles may use deployable munitions as payloads. The payloads may be carried by a flight vehicle such as a missile having a rocket motor.

Propulsion systems that use multiple pulses may be particularly suitable for use in hypersonic applications. A multi-pulse propulsion system may include a multi-pulse rocket motor, which generates multiple discrete thrust events. An exemplary use would be accelerating a payload with an initial pulse and reaccelerating the payload with one or more additional pulses, achieving increased range of the vehicle and/or achieving control authority as the vehicle approaches critical proximity of a desired target. Using a multi-pulse propulsion system is advantageous in enabling increased range, maneuverability and efficiency in launching a payload such as a warhead.

SUMMARY OF THE INVENTION

Conventional multi-pulse propulsion systems typically use igniters that are controlled by electronics from the mission computer (e.g., guidance system) to actively initiate each pulse ignition. Such conventional multi-pulse propulsion systems may be disadvantageous in that the duplication of system electronics and igniters for initiating each pulse of the multi-pulse motor accommodates a large volume in a volume-constrained system and adds overall cost and complexity to system. This is often at the expense of propellant volume and mass. Additionally, retrofitting an existing vehicle designed and deployed with a single pulse motor requires extensive changes to guidance system hardware and software to control the additional pulses.

An aspect of the present disclosure provides a multi-pulse rocket motor having a passive system for initiating one or more pulses of the rocket motor. This eliminates or reduces the complexity and volume constraints associated with conventional multi-pulse propulsion systems. Such a passive system, therefore, may be incorporated into smaller vehicle platforms than is currently practical with conventional multi-pulse systems, and would allow retrofit activities as described above to be implemented more cost efficiently.

According to an aspect, a multi-pulse propulsion system includes: at least one pulse chamber containing at least one propellant for igniting during at least one pulse of the multi-pulse propulsion system; at least one additional pulse chamber containing at least one additional propellant for igniting during at least one additional pulse of the multi-pulse propulsion system; and at least one passive fuzing system configured to initiate the at least one additional pulse, the at least one passive fuzing system comprising a sensor and an igniter, the sensor being configured to sense an environmental condition and/or a ballistic condition, and the igniter being configured to provide a stimulus that causes ignition of the at least one additional propellant in response to the sensor sensing that the environmental condition and/or the ballistic condition has reached or exceeded one or more threshold values.

According to an embodiment of any paragraph(s) of this summary, the multi-pulse propulsion system further includes another igniter configured to initiate the at least one pulse by igniting the at least one propellant contained in the at least one pulse chamber, the another igniter being controlled by a main system controller; wherein the passive fuzing system is operable independent of a connection to the main system controller.

According to an embodiment of any paragraph(s) of this summary, the sensor is a passive electronic device.

According to an embodiment of any paragraph(s) of this summary, the sensor is a piezoelectric device.

According to an embodiment of any paragraph(s) of this summary, the sensor is a micro-electro-mechanical system device, a semiconductor device, a shape memory material device, or a Peltier device.

According to an embodiment of any paragraph(s) of this summary, the environmental condition sensed by the sensor includes temperature or pressure, and when a threshold temperature or pressure value is sensed by the sensor, the igniter is activated to ignite the at least one additional propellant, thereby initiating the at least one additional pulse.

According to an embodiment of any paragraph(s) of this summary, the sensor is a temperature sensor selected from: a thermistor, a thermocouple, a resistance temperature detector, or a piezoelectric temperature sensor.

According to an embodiment of any paragraph(s) of this summary, the sensor is a piezoelectric pressure sensor or a micro-electro-mechanical pressure sensor.

According to an embodiment of any paragraph(s) of this summary, the ballistic condition sensed by the sensor includes velocity and/or acceleration, and when a threshold velocity and/or acceleration value is sensed by the sensor, the igniter is activated to ignite the at least one additional propellant, thereby initiating the at least one additional pulse.

According to an embodiment of any paragraph(s) of this summary, the sensor is located in a skin of a flight vehicle that contains the multi-pulse propulsion system; or the sensor is located in a nose cone of the flight vehicle containing the multi-pulse propulsion system.

According to an embodiment of any paragraph(s) of this summary, the passive fuzing system further includes an energetic transfer part that is configured to transmit and/or transform energy from the sensor and transfer the energy to the igniter.

According to an embodiment of any paragraph(s) of this summary, the energetic transfer part transmits electrical energy from the sensor to the igniter.

According to an embodiment of any paragraph(s) of this summary, the energetic transfer part is a pyrotechnic device or pyrotechnic material that transmits thermal energy to the igniter.

According to an embodiment of any paragraph(s) of this summary, the igniter includes an explosive material.

According to an embodiment of any paragraph(s) of this summary, the igniter includes a pyrotechnic initiator having a pyrotechnic material composition.

According to an embodiment of any paragraph(s) of this summary, the at least one pulse chamber is separated from the at least one additional pulse chamber by a barrier, and the igniter is disposed in the at least one additional pulse chamber and coupled to a surface of the barrier.

According to an embodiment of any paragraph(s) of this summary, the at least one pulse chamber is separated from the at least one additional pulse chamber by a barrier, and the igniter is located in the at least one additional pulse chamber at an opposite end from the barrier.

According to another aspect, a flight vehicle includes: a payload; and a multi-pulse propulsion system, the multi-pulse propulsion system including: at least one pulse chamber containing at least one propellant for igniting during at least one pulse of the multi-pulse propulsion system; and at least one passive fuzing system configured to initiate the at least one pulse, the at least one passive fuzing system comprising a sensor and an igniter, the sensor being configured to sense an environmental condition and/or a ballistic condition, and the igniter being configured to provide a stimulus that causes ignition of the at least one propellant in response to the sensor sensing that the environmental condition and/or the ballistic condition has reached or exceeded one or more threshold values.

According to an embodiment of any paragraph(s) of this summary, the flight vehicle has a diameter in the range from 40 mm to 130 mm.

According to another aspect, a method of operating a multi-pulse propulsion system of a flight vehicle, includes: (i) sensing an environmental condition and/or a ballistic condition of the flight vehicle with a sensor of a passive fuzing system of the multi-pulse rocket motor; (ii) determining with the passive fuzing system when the environmental condition and/or the ballistic condition has reached or exceed a threshold environmental condition value and/or a threshold ballistic condition value; and (iii) when the environmental condition and/or the ballistic condition has reached or exceed the threshold environmental condition value, initiating a pulse of the multi-pulse propulsion system by igniting a propellant contained in a pulse chamber of the multi-pulse propulsion system.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles and aspects described herein have application in defense applications, such as in a hypersonic vehicle or any flight vehicle where space may be constrained. The multi-pulse propulsion system described herein may be implemented in a rocket that includes a multi-pulse rocket motor and carries a warhead. Other suitable applications may include different launching platforms or vehicles that include multi-pulse propulsion systems for launching a payload.

Figure 1:
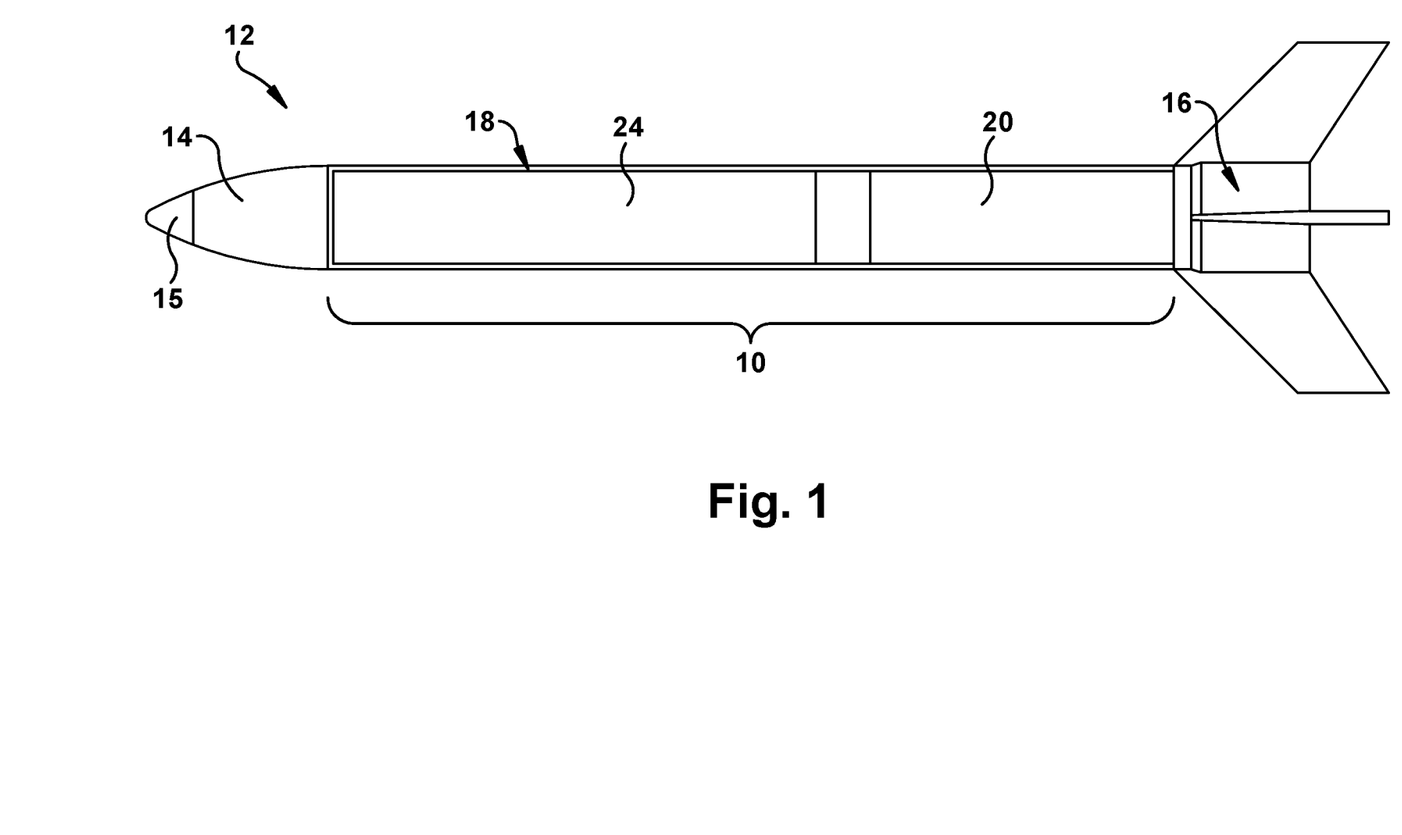
FIG. 1 shows a flight vehicle having a multi-pulse propulsion system in accordance with an exemplary embodiment of the present disclosure.
Figure 2:
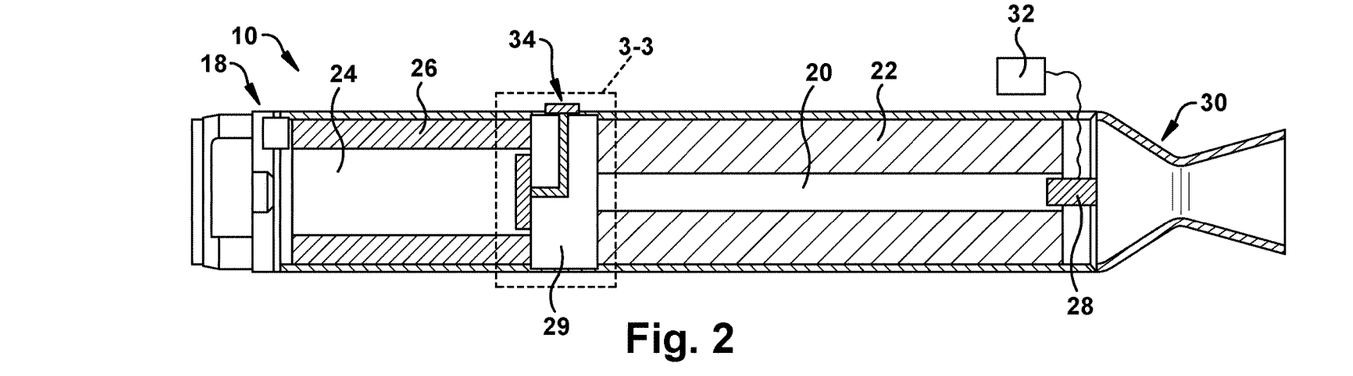
FIG. 2 is an enlarged view of the multi-pulse propulsion system shown in FIG. 1.

Referring initially to FIG. 1, a propulsion system 10 is shown arranged in a flight vehicle 12, such as a hypersonic vehicle or a rocket. The flight vehicle 12 includes a payload module 14 having at least one launchable payload. Any suitable payload may be arranged in the payload module 14 and the payload module 14 may include a plurality of payloads. Exemplary payloads include satellites, space probes, cargo, or warheads.

The propulsion system 10 may be arranged in a separable stage of the flight vehicle 12. The flight vehicle 12 may have any suitable number of separable stages. For example, the flight vehicle 12 may include between two and five separable stages that are separable from the flight vehicle 12 at pre-determined times during travel of the flight vehicle 12. In an exemplary application, the flight vehicle 12 may include at least a first stage and a second stage. The first stage may include a first-stage propulsion device 16 that is arranged opposite the payload module 14. The first-stage propulsion device 24 may include engines, boosters, tail fins, other thrusters, or any other suitable propulsion devices.

Referring now particularly to FIGS. 2-5, embodiments of the exemplary propulsion system 10 are shown in further detail. As shown, the propulsion system 10 includes a multi-pulse rocket motor 18 for providing at least two distinct propulsive pulses. In exemplary embodiments, the multi-pulse rocket motor 18 may be a dual-pulse rocket motor that burns in two segments such that the rocket motor has a first pulse state and an additional pulse state that is initiated after the first pulse state. It is understood that the multi-pulse rocket motor 18 may include any number of pulse states as may be desired for a particular application.

As shown in the illustrated embodiment, the rocket motor includes at least a first pulse chamber 20 containing a first burnable propellant 22 for burning during the first pulse state, and a second pulse chamber 24 containing a second burnable propellant 26 for burning during a second pulse state. A first igniter 28 is located in the first pulse chamber 20 and is configured to initiate the first pulse state by igniting the first burnable propellant, which causes pressurization in the first pulse chamber 20. The first pulse chamber 20 is configured for pressurization prior to pressurization of the second pulse chamber 24, such as by separating the pulse chambers 20, 24 via a barrier 29. The pressurized gas in the first pulse chamber 20 is exhausted through nozzle assembly 30, thereby generating thrust. As is well-known in the art, the first igniter 28 may be controlled by an electronic controller 32, such as the main vehicle computer 32 (e.g., guidance system) to actively initiate the first pulse ignition.

The first burn propellant 22 contained in the first pulse chamber 20 may have different characteristics as compared with the second burnable propellant 26 contained in the second pulse chamber 24. For example, the propellants 22, 26 may be configured to provide different burning rates relative to each other. The pulse chambers 20, 24 may be formed to have different sizes such that different amounts of the propellants 22, 26 may be provided. The sizes and burn rates of the propellants 22, 26 and pulse chambers 20, 24 may be dependent on the desired operation for a particular application of the flight vehicle 12.

In exemplary embodiments, the propellants 22, 26 are solid propellant grains that are configured to burn when ignited to produce exhaust gas in the corresponding pulse chambers 20, 24. The exhaust gas is directed through the nozzle assembly 30 to produce thrust for the flight vehicle 12. The shape and size of the propellant grains is predetermined to achieve a specific burn time, amount of exhaust gas, and a thrust level. As shown, the pulse chambers 20, 24 and thus the propellants 22, 26 are separated by the barrier 29, which may be any suitable separation device configured such that during the first pulse state of the flight vehicle 12, the first propellant 22 burns separately relative to the second propellant 26 which burns during the second pulse state of the flight vehicle 12. The barrier 29 may include a bulkhead of the flight vehicle 12 and/or the barrier 29 may include a suitable thermal barrier, for example.

Figure 3:
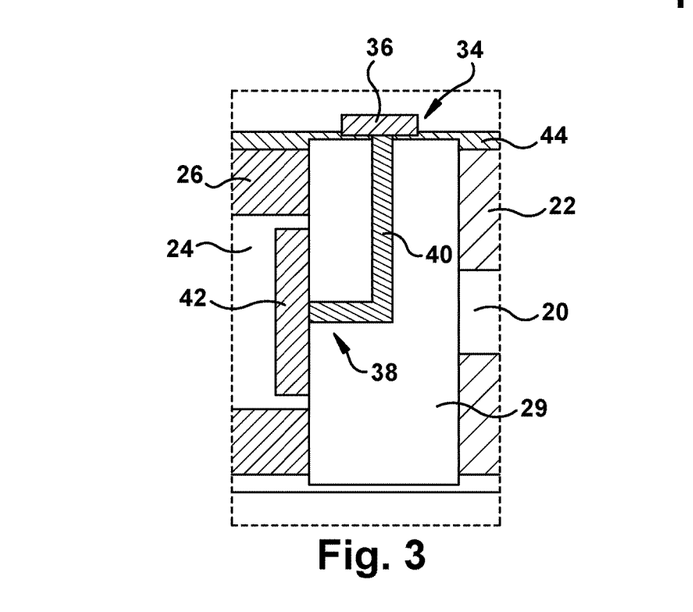
FIG. 3 is an enlarged view of an exemplary passive fuzing system of the multi-pulse propulsion system that is taken from section 3-3 in FIG. 2.
Figure 4:
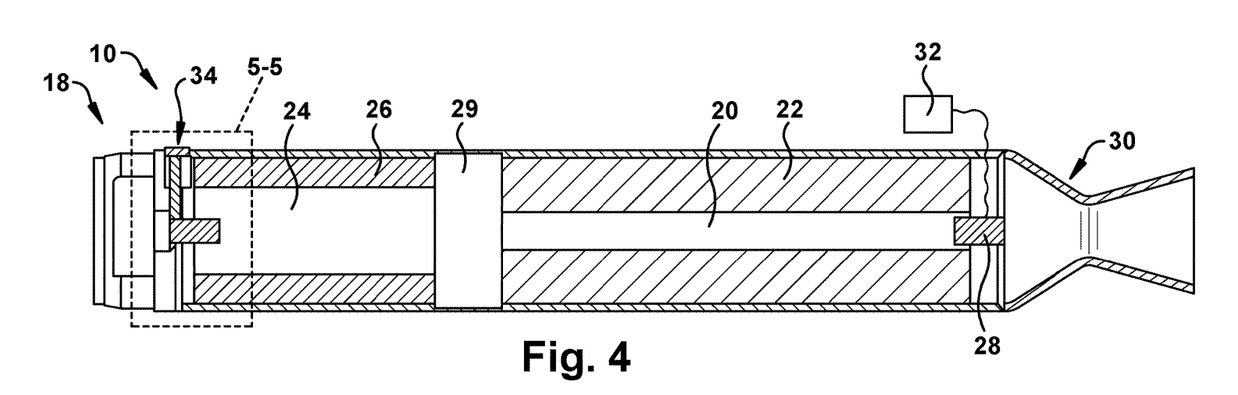
FIG. 4 is an enlarged view of another exemplary embodiment of the multi-pulse propulsion shown in FIG. 1.
Figure 5:
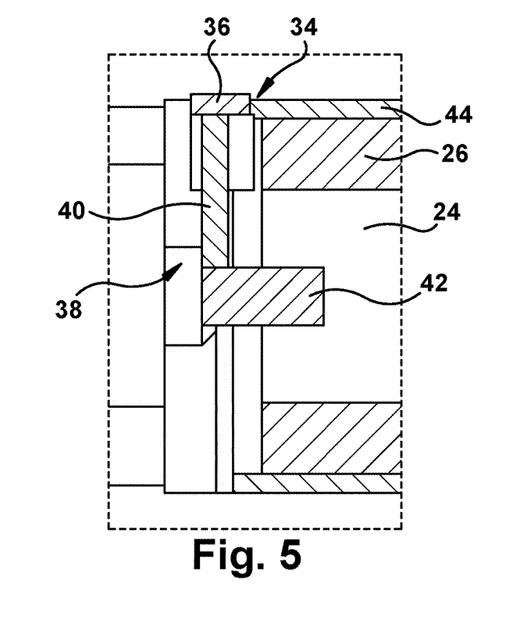
FIG. 5 is an enlarged view of another exemplary embodiment of a passive fuzing system that is taken from section 5-5 in FIG. 4.

Referring particularly to FIGS. 3 and 5, exemplary embodiments of a passive fuzing system 34 of the multi-pulse rocket motor 18 are shown in further detail. The passive fuzing system 34 is configured to initiate the second pulse state of the motor via ignition of the second propellant 26. Any number of passive fuzing systems 34 may be provided for initiating the second pulse state, or any subsequent pulse state via ignition of additional propellant in subsequent pulse chambers. As discussed in further detail below, the passive fuzing system 34 may include one or more passive components or parts that are operable without external triggering logic. In this manner, initiation of the second pulse state and/or subsequent pulse states of the rocket motor 18 may be accomplished through activation of the passive fuzing system 34 independently of initiation by an electronic controller, and more particularly independent of the main vehicle electronics (e.g., main controller 32) that initiates the first pulse state of the rocket motor 18. This eliminates or reduces the complexity and volume constraints associated with conventional multi-pulse propulsion systems. Such a passive fuzing system 34, therefore, may be incorporated into smaller vehicle platforms than is currently practical with conventional multi-pulse systems.

As shown in the illustrated embodiments, the passive fuzing system 34 generally includes at least one sensor 36 and at least one igniter assembly 38. The sensor(s) (or sensing part(s)) 36 is/are configured to sense an environmental condition and/or ballistic condition of the flight vehicle 12 during flight. As shown, the igniter assembly 38 may include an energetic transfer device 40 (or part) and an igniter 42 (or initiator part). As described in further detail below, the igniter assembly 38, and more particularly the igniter 42, is configured to provide a stimulus that causes ignition of the second burnable propellant 26 in response to the sensor 36 sensing that the environmental condition and/or ballistic condition has reached or exceeded one or more threshold values.

The sensor 36, or sensing part, of the passive fuzing system 34 may be any suitable sensor or sensing part that is capable of sensing or detecting an environmental condition and/or ballistic condition of the flight vehicle 12. Multiple sensors or sensing parts may be utilized for achieving such functionality, which may be singly or collectively referred to hereinafter as sensor 36 for simplicity. The sensor 36 may have any suitable construction for sensing the desired condition. In exemplary embodiments, one or more of the sensor(s) 36 is/are passive devices, such as passive electronic devices, that are operable to sense the desired condition without an external logic controlling the firing current by way of an external electrical signal. Examples of such passive electronic devices include, but are not limited to, one or more of a piezoelectric device, a micro-electro-mechanical system (MEMS) device, a semiconductor device, a shape memory material device, a Peltier device, or the like.

The environmental and/or ballistic condition sensed by the sensor 36 may be any desired environmental and/or ballistic condition. In exemplary embodiments, the environmental condition sensed by the sensor 36 is temperature and/or pressure. By way of example, and not limitation, a suitable passive temperature sensor may include a thermistor, a thermocouple, a resistance temperature detector, a piezoelectric temperature sensor, or any other suitable passive temperature sensing device or part. By way of example, and not limitation, a suitable passive pressure sensor may include a piezoelectric pressure sensor, a MEMS device, pitot tube, pressure transducer, or any other suitable passive pressure sensing device or part. In exemplary embodiments, the ballistic condition sensed by the sensor 36 is velocity (e.g., linear or angular velocity) and/or acceleration/deceleration. By way of example, and not limitation, a suitable passive ballistic condition sensor may include a MEMS device, such as an accelerometer, or any other suitable passive velocity/acceleration sensing device or part, such as a gyroscope (e.g., a passive resonator gyroscope).

The sensor(s) 36 of the passive fuzing system 34 may be located at any suitable part of the flight vehicle 12 for sensing the desired condition. For example, the sensor(s) 36 may have an external face that is exposed to the external environment of the flight vehicle 12, which may be atmospheric (e.g., troposphere, stratosphere, mesosphere, thermosphere, exosphere) or outer space. As shown in the illustrated embodiments, for example, the sensor(s) 36 may be located on a skin 44 of the flight vehicle 12. Alternatively or additionally, the sensor(s) 36 may be located in a nose cone 15 (see FIG. 1) of the flight vehicle 12, for example.

The energetic transfer device 40 (or energetic transfer part) of the passive fuzing system 34 is configured to transmit energy from the sensor 36 to the igniter 42. As such, the energetic transfer device 40 is operably coupled to both the sensor 36 and the igniter 42, which may include other components or parts interposed there between for facilitating operation of the passive fuzing system 34. The energetic transfer device 40 may be located at any suitable part of the flight vehicle 12 for providing such operable connection between the sensor 36 and igniter 42, which such placement may be dependent on the type of energetic transfer device 40. One or more energetic transfer devices 40 may be provided. The energy transferred by the energetic transfer device 40 may be any form of energy dependent on the particular type of sensor 36, and the energy from the sensor 36 may be transformed to another type of energy by the energetic transfer device, or other connected component, for transferring to the igniter 42.

By way of example, and not limitation, the energetic transfer device 40 may transmit electrical energy in the form of current provided by the sensor 36 to the igniter 42, which may activate the igniter 42 to cause ignition of the second burnable propellant 26. In such a scenario, the energetic transfer device 40 may include an electrical wire, such as a copper wire, for transmitting the current from the sensor 36 to the igniter 42.

Alternatively or additionally, the energetic transfer device 40 may include a pyrotechnic device or material that transmits thermal energy to the igniter 42. By way of example, and not limitation, the pyrotechnic device may include a detonation cord, such as a mild detonation cord, for example shielded mild detonation cord, flexible detonation cord, or the like. The pyrotechnic device may include a detonation cord assembly, for example, an RDX filled transfer line with insulative and structural overwraps. The pyrotechnic device may include a suitable blasting cap. The pyrotechnic device may be any other suitable type of fuse.

Alternatively or additionally, the energetic transfer device 40 may provide a combination of electrical and thermal impulses for causing the igniter 42 to ignite the propellant 26. For example, an electrical wire may be provided for transmitting an electrical stimulus from the sensor 36 to a blasting cap, which in response to a threshold electrical stimulus by the sensor 36, may detonate the blasting cap to thereby transmit thermal energy that ignites a detonation cord, which thereby transmits thermal energy to activate the igniter 42. Alternatively, for example, a bridgewire may be provided with a pyrotechnic material that is activated when the bridgewire is heated by resistance beyond a threshold level in response to an electrical current from the sensor 36.

The igniter 42 may be any suitable device or part that provides a sufficient stimulus to cause ignition of the propellant 26 when the igniter 42 has been activated or triggered. For example, the igniter 42 may include an explosive material, such as a shape charge, which is triggered to explode by energy transferred by the energetic transfer device 40 (e.g., wire or detonation cord). The heat from the explosion of the shape charge will initiate the second pulse via burning of propellant 26.

Alternatively or additionally, the igniter 42 may include a pyrotechnic initiator, which may have a pyrotechnic material composition that causes a self-sustained exothermic chemical reaction when activated to make heat sufficient to burn the propellant 26. The composition of the pyrotechnic initiator may be adjusted to tune the activation temperature of the igniter 42. Examples of such pyrotechnic initiators include, but are not limited to: metal-oxidizers (e.g., zirconium-potassium perchlorate, boron-potassium nitrate, aluminum-potassium perchlorate, or titanium-aluminum-potassium perchlorate); metal hydride-oxidizer (e.g., zirconium hydride-potassium perchlorate, titanium hydride potassium perchlorate); intermetallics (e.g., titanium-boron, nickel-aluminum, palladium-aluminum); or the like.

The igniter 42 may be located at any suitable part of the flight vehicle 12 for providing the stimulus that ignites the second propellant 26. In exemplary embodiments, the igniter 42 is located in the second pulse chamber 24 with sufficient proximity to the propellant 26 to cause the propellant to burn when the igniter 42 is activated or triggered.

Referring briefly to FIG. 3, for example, the igniter 42 may be located proximally to, or coupled to, a surface of the barrier 29. When activated, the igniter 42 will break down the barrier 29 to open the pulse chamber 24 to the nozzle assembly 30. The igniter 42 may break down the barrier 29 via explosive force (e.g., when the igniter 42 includes a shape charge) and/or the igniter 42 may break down the barrier 29 via thermal energy (e.g., when the igniter 42 includes a pyrotechnic material). Also when the igniter 42 is activated, the igniter 42 will provide sufficient energetic stimulus to ignite the propellant 26, thereby causing the propellant 26 to burn and produce exhaust gas in the chamber 24. With the barrier 29 destroyed, the exhaust gas is directed through the nozzle assembly 30 to produce thrust for the flight vehicle 12.

Referring briefly to FIG. 5, for example, the passive fuzing system 34 is shown at a different location of the flight vehicle 12 as compared to FIG. 3. As shown, the igniter 42 is located at an opposite (e.g., forward) end of the chamber 24 away from the barrier 29. The igniter 42 may be the same as that described above in connection with FIG. 3. In the embodiment illustrated in FIG. 5, when the igniter 42 is activated, the igniter 42 will provide sufficient energetic stimulus to ignite the propellant 26, thereby causing the propellant 26 to burn and produce exhaust gas in the chamber 24. The pressure and/or temperature generated by burning the propellant 26 will break down barrier 29 to open the chamber 24 to the nozzle assembly 30. With the barrier 29 destroyed, the exhaust gas is directed through the nozzle assembly 30 to produce thrust for the flight vehicle 12.

Figure 6:
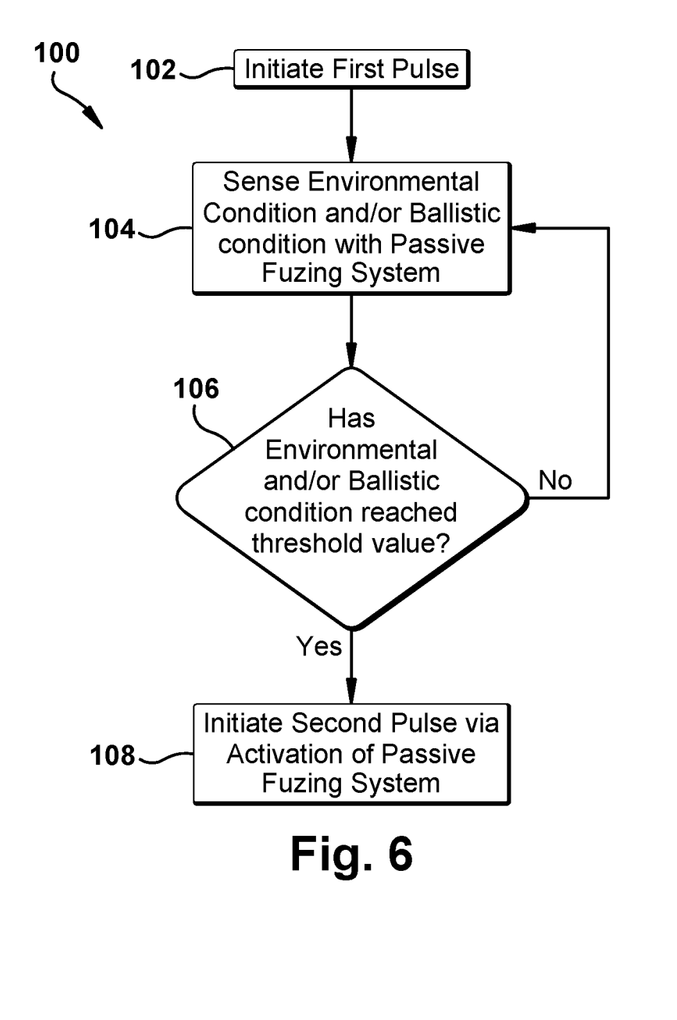
FIG. 6 is a flow chart for using the multi-pulse propulsion system of FIGS. 1-5.

Turning now to FIG. 6, an exemplary method 100 of operating the multi-pulse rocket motor 18 is shown. As shown, the method 100 starts at step 102 with initiating the first pulse state of the rocket motor 18, which may be accomplished in a conventional manner as described above.

At step 104, the sensor(s) 36 of the passive fuzing system 34 sense the environmental and/or ballistic condition of the flight vehicle 12. This is accomplished as described above, in which the sensor(s) 36 may be configured to sense temperature, pressure, acceleration, velocity, or any other suitable environmental and/or ballistic condition.

At step 106, the passive fuzing system 34 is configured to determine whether the environmental and/or ballistic condition sensed by the sensor(s) 36 has reached or exceeded a threshold value. As shown at step 108, when the sensed condition has reached or exceeded the threshold value, the second pulse state is initiated. The threshold value may be any suitable value which may be adjusted depending on the configuration of the passive fuzing system 34. By way of example, and not limitation, a threshold temperature value that causes initiation of the second pulse state may be in a range from 700-725° F. By way of example, and not limitation, a threshold pressure value that causes initiation of the second pulse state may be in a range from 4-5 psi. By way of example, and not limitation, a threshold acceleration value that causes initiation of the second pulse state may be in a range from 80-100 ft/sec$^2$.

The determination at step 106 may be made in any suitable manner dependent on the particular configuration of the passive fuzing system 34. For example, the energy output from the sensor 36 may vary proportionally to the input condition sensed by the sensor 36. At step 108, when the input condition reaches the threshold value, the energy output from the sensor 36 may reach a threshold value that causes, directly or indirectly, activation or triggering of the igniter 42 which initiates the second pulse state of the motor 18, as described above. On the other hand, if the input condition sensed by the sensor 36 does not reach or exceed the threshold value, then the proportional output from the sensor 36 may be insufficient to activate, directly or indirectly, the igniter 42. In this scenario, the sensor(s) 36 will continue to sense the environmental and/or ballistic conditions, as shown in the method 100 by looping back to step 104.

As discussed above, multiple sensors 36 may be used to sense the same or different environmental and/or ballistic conditions, and the respective outputs of these sensors 36 may be combined to reach the activation threshold that causes, directly or indirectly, activation of the igniter 42. Such combination of sensor outputs may enable the passive fuzing system 34 to require multiple threshold values to be met prior to initiating the second pulse state. As noted above, such energy output from the sensor(s) 36 may be transferred directly to the igniter 42 in the same form, such as via the energetic transfer device 40 (e.g., electrical wire); or the energy output from the sensor(s) 36 may be transferred indirectly by the energetic transfer device 40 transforming the energy to another form (e.g., blasting cap and/or detonation cord, for example).

A non-limiting example of a passive fuzing system 34 according to the foregoing will now be described in further detail. In an exemplary system, the sensor 36 is a passive piezoelectric pressure sensor that generates an electrical output signal in response to strain applied to the sensor. The output from the piezoelectric sensor is a charge proportional to the sensed pressure. A small battery may be connected to amplify this charge and/or provide sufficient impetus to ignite a propellant grain. The energetic transfer device 40 is an electric wire that transmits this electrical charge to the igniter 42. The igniter 42 is a shape charge explosive that is configured to detonate when the charge transmitted from the pressure sensor reaches a threshold activation value. This threshold activation value may be achieved when the strain applied to the sensor exceeds a threshold value in response to the environmental pressure sensed reaching a threshold value.

Another non-limiting example of a passive fuzing system 34 may include a sensor 36 in the form of a passive piezoelectric pressure sensor, an energetic transfer device 40 in the form of a blasting cap and detonation cord operably coupled to the piezoelectric sensor, and an igniter 42 in the form of an intermetallic pyrotechnic material (e.g., Pd/Al) that is operably coupled to the detonation cord. In an exemplary system, the sensor 36 is a passive piezoelectric pressure sensor that generates an electrical output signal in response to strain applied to the sensor. The output from the piezoelectric sensor is a command charge triggered by the sensed pressure. A battery may be connected to amplify this charge. The energetic transfer device 40 is blasting cap, the output of which triggers a detonation cord that transmits a combination of heat and/or shock to an igniter. The igniter 42 contains intermetallic pyrotechnic material that is initiated when the charge output is transmitted from the detonation cord.

Figure 7:
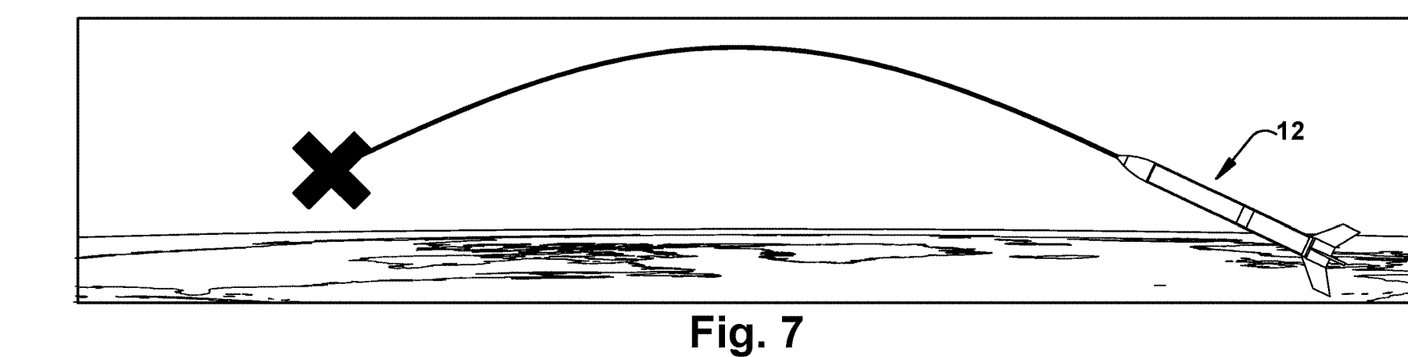
FIG. 7 is a schematic of an exemplary long-range trajectory of the flight vehicle in FIG. 1
Figure 8:
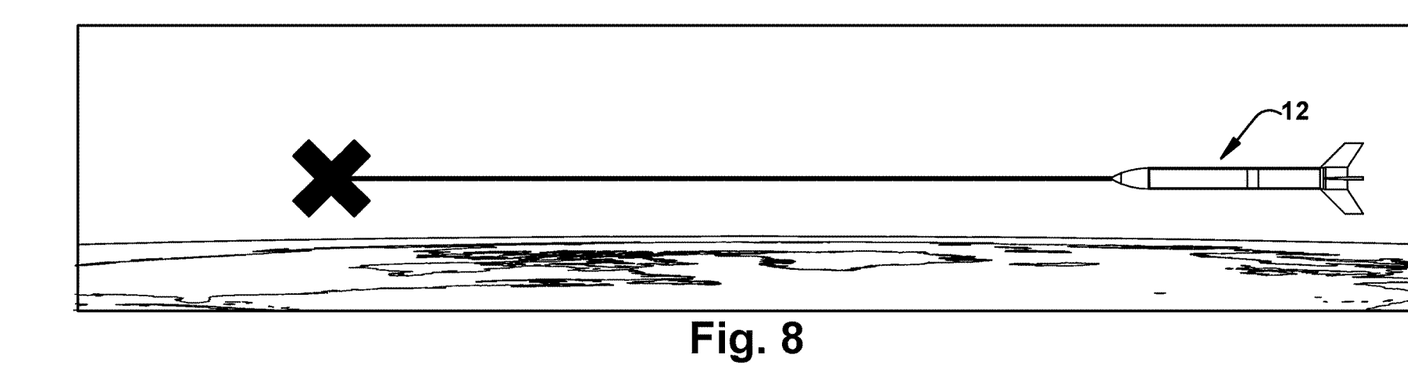
FIG. 8 is a schematic of an exemplary short-range trajectory of the flight vehicle in FIG. 1

Turning to FIGS. 7 and 8, trajectory shaping of the flight vehicle 12 may be utilized for optimally activating the passive fuzing system 34 and thereby initiating the second pulse state of the rocket motor 18. In FIG. 7, a long range trajectory of the flight vehicle 12 is shown, in which the flight vehicle 12 rockets to a high elevation (such as via the first pulse), and when the threshold condition is met, the second pulse is initiated. In such a scenario, the threshold condition for initiating the second pulse may be a reduction in atmospheric pressure as the vehicle 12 increases in altitude, an increase in temperature as the vehicle 12 re-enters denser atmosphere, or reduction in acceleration as the vehicle 12 loses velocity, for example. In FIG. 8, a short range trajectory of the flight vehicle 12 is shown, in which higher density air may be utilized for reaching the threshold condition (e.g., via heating as the vehicle 12 rockets through the atmosphere).

As discussed above, the exemplary passive fuzing system 34 may help to eliminate or reduce the complexity and volume constraints associated with conventional multi-pulse propulsion systems. Such a passive system, therefore, may be incorporated into smaller vehicle platforms than is currently practical with conventional multi-pulse systems. For example, the flight vehicle 12 having the exemplary multi-pulse motor 18 with passive fuzing system 34 may be used with missiles having diameters of about 125 mm or less (e.g., about 5-inches or less), such as missiles having a diameter in the range of about 40 mm (e.g., about 1.5-inches) to about 125 mm (e.g., about 5-inches). It is of course understood that the multi-pulse rocket motor 18 with passive fuzing system 34 also may be used with larger diameter missiles or other flight vehicles as well.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. Typically, an operable connection includes a physical interface, a thermal interface, or an electrical interface, but it is to be noted that an operable connection may include differing combinations of these or other types of connections sufficient to allow operable control. An operable connection or coupling may include the entities being integral and unitary with each other.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A multi-pulse propulsion system comprising:
   a main system controller configured to initiate at least one pulse of the multi-pulse propulsion system;
   at least one pulse chamber containing at least one propellant for igniting during the at least one pulse;
   a first igniter connected to and controlled by the main system controller configured to initiate the at least one pulse by igniting the at least one propellant contained in the at least one pulse chamber;
   at least one additional pulse chamber containing at least one additional propellant for igniting during at least one additional pulse of the multi-pulse propulsion system, wherein the at least one additional pulse is subsequent to and separate from the at least one pulse, wherein the at least one additional propellant is not ignited until the at least one additional pulse; and
   at least one passive fuzing system including one or more passive components that are operable without external triggering logic, wherein the at least one passive fuzing system is separate from the main system controller and configured to initiate the at least one additional pulse independently of initiation by the main system controller, the at least one passive fuzing system comprising a sensor and a second igniter, the sensor being configured to sense an environmental condition, and the second igniter being configured to provide a stimulus that causes ignition of the at least one additional propellant in response to the sensor sensing that the environmental condition has reached or exceeded one or more threshold values, wherein the passive fuzing system is operable independent of a connection to the main system controller,
   wherein the environmental condition sensed by the sensor includes temperature or pressure, and
   wherein when a threshold temperature or pressure value is sensed by the sensor, the second igniter is activated to ignite the at least one additional propellant, thereby initiating the at least one additional pulse.

2. The multi-pulse propulsion system according to claim 1, wherein the sensor is a passive electronic device.

3. The multi-pulse propulsion system according to claim 1, wherein the sensor is a piezoelectric device.

4. The multi-pulse propulsion system according to claim 1, wherein the sensor is a micro-electro-mechanical system device, a semiconductor device, a shape memory material device, or a Peltier device.

5. The multi-pulse propulsion system according to claim 1, wherein the sensor is a temperature sensor selected from: a thermistor, a thermocouple, a resistance temperature detector, or a piezoelectric temperature sensor.

6. The multi-pulse propulsion system according to claim 1, wherein the sensor is a piezoelectric pressure sensor or a micro-electro-mechanical pressure sensor.

7. The multi-pulse propulsion system according to claim 1, wherein the sensor is further configured to sense a ballistic condition.

8. The multi-pulse propulsion system according to claim 1, wherein the sensor is located in a skin of a flight vehicle that contains the multi-pulse propulsion system; or the sensor is located in a nose cone of the flight vehicle containing the multi-pulse propulsion system.

9. The multi-pulse propulsion system according to claim 1, wherein the passive fuzing system further includes an energetic transfer part that is configured to transmit and/or transform energy from the sensor and transfer the energy to the second igniter.

10. The multi-pulse propulsion system according to claim 9, wherein the energetic transfer part transmits electrical energy from the sensor to the igniter.

11. The multi-pulse propulsion system according to claim 9, wherein the energetic transfer part is a pyrotechnic device or pyrotechnic material that transmits thermal energy to the second igniter.

12. The multi-pulse propulsion system according to claim 1, wherein at least one of the first igniter or the second igniter includes an explosive material.

13. The multi-pulse propulsion system according to claim 1, wherein at least one of the first igniter or the second igniter includes a pyrotechnic initiator having a pyrotechnic material composition.

14. The multi-pulse propulsion system according to claim 1, wherein:
   the at least one pulse chamber is separated from the at least one additional pulse chamber by a barrier, and
   the second igniter is disposed in the at least one additional pulse chamber and coupled to a surface of the barrier.

15. The multi-pulse propulsion system according to claim 1, wherein:
   the at least one pulse chamber is separated from the at least one additional pulse chamber by a barrier, and
   the igniter is located in the at least one additional pulse chamber at an opposite end from the barrier.

16. The multi-pulse propulsion system according to claim 7, wherein:
   the ballistic condition sensed by the sensor includes velocity and/or acceleration, and
   when a threshold velocity and/or acceleration value is sensed by the sensor, the second igniter is activated to ignite the at least one additional propellant, thereby initiating the at least one additional pulse.

17. A flight vehicle comprising:
   a payload; and
   a multi-pulse propulsion system, the multi-pulse propulsion system comprising:
      at least one pulse chamber containing at least one propellant for igniting during at least one pulse of the multi-pulse propulsion system;
      a first igniter configured to initiate the at least one pulse by igniting the at least one propellant contained in the at least one pulse chamber, wherein the first igniter being controlled by a main system controller;
      at least one additional pulse chamber containing at least one additional propellant for igniting during at least one additional pulse of the multi-pulse propulsion system, wherein the at least one additional pulse is subsequent to and separate from the at least one pulse, wherein the at least one additional propellant is not ignited until the at least one additional pulse; and
      at least one passive fuzing system configured to initiate the at least one additional pulse, the at least one passive fuzing system comprising a sensor and a second igniter, the sensor being configured to sense an environmental condition and a ballistic condition, and the second igniter being configured to provide a stimulus that causes ignition of the at least one additional propellant in response to the sensor sensing that the environmental condition and the ballistic condition has reached or exceeded one or more threshold values, wherein the passive fuzing system is operable independent of a connection to the main system controller, wherein the passive fuzing system is operable independent of main vehicle electronics that initiate the at least one pulse, wherein the environmental condition sensed by the sensor includes temperature or pressure, and wherein when a threshold temperature or pressure value is sensed by the sensor, the second igniter is activated to ignite the at least one additional propellant, thereby initiating the at least one additional pulse.

18. The flight vehicle according to claim 17, wherein the flight vehicle has a diameter in the range from 40 mm to 130 mm.

19. A method of operating a multi-pulse propulsion system of a flight vehicle, comprising:

sensing an environmental condition of the flight vehicle with a sensor of a passive fuzing system of the multi-pulse propulsion system;

determining with the passive fuzing system when the environmental condition has reached or exceed a threshold environmental condition value; and when the environmental condition has reached or exceed the threshold environmental condition value, initiating a first pulse of the multi-pulse propulsion system by igniting a propellant contained in a first pulse chamber of the multi-pulse propulsion system with a first igniter of the passive fuzing system, wherein the multi-pulse propulsion further includes:

a second pulse chamber containing at least one second propellant for igniting during a second pulse of the multi-pulse propulsion system;

a main system controller configured to initiate the second pulse of the multi-pulse propulsion system; and a second igniter connected to and controller by the main system controller and configured to initiate the second pulse by igniting the second propellant contained in the second pulse chamber, wherein the passive fuzing system is separate from the main system controller and operable independent of a connection to the main system controller, wherein the passive fuzing system is configured to initiate the first pulse independently of initiation by the main system controller, wherein the at second pulse is prior to and separate from the first pulse, wherein the propellant in the first pulse chamber is not ignited until the first pulse, wherein the environmental condition sensed by the sensor includes temperature or pressure, and wherein when a threshold temperature or pressure value is sensed by the sensor, the first igniter is activated to ignite the propellant, thereby initiating the first pulse.

20. The method of operating the multi-pulse propulsion system according to claim 19, further comprising sensing a ballistic condition of the flight vehicle with the sensor of the passive fuzing system of the multi-pulse propulsion system.

* * * * *